US008492664B2

(12) United States Patent
Mazelle et al.

(10) Patent No.: US 8,492,664 B2
(45) Date of Patent: Jul. 23, 2013

(54) COLLAR FOR MAINTAINING ELECTRIC CABLES

(75) Inventors: Christian Henry Mazelle, Saclay (FR); Pascal Pelisson, Le Chatelet en Brie (FR)

(73) Assignee: SNECMA, Paris (FR)

( * ) Notice: Subject to any disclaimer, the term of this patent is extended or adjusted under 35 U.S.C. 154(b) by 316 days.

(21) Appl. No.: 12/859,589

(22) Filed: Aug. 19, 2010

(65) Prior Publication Data
US 2011/0048798 A1 Mar. 3, 2011

(30) Foreign Application Priority Data

Aug. 20, 2009 (FR) ...................................... 09 55717

(51) Int. Cl.
*H02G 3/18* (2006.01)
*H02G 3/08* (2006.01)
(52) U.S. Cl.
USPC .............................. 174/655; 174/481; 174/34
(58) Field of Classification Search
USPC ........................................................ 174/655
See application file for complete search history.

(56) References Cited

U.S. PATENT DOCUMENTS

| | | | | |
|---|---|---|---|---|
| 3,005,037 A | * | 10/1961 | Miller | 174/481 |
| 6,359,223 B1 | * | 3/2002 | Daoud | 174/658 |
| 6,362,427 B1 | * | 3/2002 | Daoud | 174/505 |
| 6,849,803 B1 | * | 2/2005 | Gretz | 174/665 |
| 2002/0125027 A1 | * | 9/2002 | Magno | 174/48 |
| 2004/0112621 A1 | * | 6/2004 | Schengrund et al. | 174/48 |
| 2005/0006123 A1 | * | 1/2005 | Burnette | 174/49 |
| 2008/0207034 A1 | * | 8/2008 | Aita | 439/277 |

FOREIGN PATENT DOCUMENTS

| | | |
|---|---|---|
| DE | 3428903 A1 | 3/1985 |
| DE | 202 03 753 U1 | 7/2002 |
| FR | 2 916 913 A1 | 12/2008 |
| FR | 2916913 A1 * | 12/2008 |
| JP | 10255572 A * | 9/1998 |
| WO | WO 2008062177 A1 * | 5/2008 |

OTHER PUBLICATIONS

English Translation of FR2916913.*

* cited by examiner

*Primary Examiner* — Adrian S Wilson
*Assistant Examiner* — Abhishek Rathod
(74) *Attorney, Agent, or Firm* — Oblon, Spivak, McClelland, Maier & Neustadt, L.L.P.

(57) ABSTRACT

A collar for maintaining electric cables is disclosed. The maintaining collar includes an annular sleeve which may be crossed by the electric cables and having two axial ends around which protective sheaths of the electric cables are intended to be mounted; an annular attachment flange capable of being attached on a fixed support, the attachment flange being maintained axially around the sleeve and capable of pivoting around the sleeve; and a seal between the maintaining collar and the support on which the seal is intended to be attached.

7 Claims, 2 Drawing Sheets

COLLAR FOR MAINTAINING ELECTRIC CABLES

BACKGROUND OF THE INVENTION

The present invention relates to the general field of maintenance of electric cables passing through a partition for separating fluids.

One of the fields of application of the invention is that of electrically controlled grid thrust reversers fitting out nacelles of turbine engines.

A thrust reverser with grids of a turbine engine generally comprises two mobile semi-cylindrical cowls belonging to the nacelle of the turbine engine. Upon landing, during deployment of the thrust reverser, these cowls slide relatively to the remainder of the nacelle of the turbine engine. One of the cowls of the thrust reverser in its lower portion harbors a hollow structure in which a cable assembly has to make its way for supplying electric power to an electric lock intended to ensure that the cowls are maintained in a closed position during the whole duration of the flight. This electric assembly also makes its way in a neighboring so-called thrust reverser compartment separated from the hollow structure by a partition so as to return in the high portion of the cowl to the pylon of the aircraft from which the electric power supply originates.

The crossing of the partition separating the hollow structure from the thrust reversion compartment by the electric power supply assembly of the lock poses certain problems. Indeed, because of its design, the hollow structure of the cowl in which the electric power supply assembly of the lock follows its course, may accidentally be filled with engine fluids (mainly kerosene or oil). The partition separating this hollow structure from the thrust reversion compartment has therefore to be perfectly fluid-proof. The consequence is that the collar with which the electric assembly may be maintained on this separation partition should also be perfectly fluid-proof. Further, this maintaining collar should allow attachment onto the separation partition without having to exert torsional movements on the electric assembly.

OBJECT AND SUMMARY OF THE INVENTION

The main object of the present invention is to propose a maintaining collar with which a fluid-proof seal may be ensured while facilitating its attachment on the separation partition.

This object is achieved by means of a collar for maintaining electric cables, characterized in that it includes:

an annular sleeve capable of being crossed by electric cables and having two axial ends around which protective sheaths of electric cables are intended to be mounted, an annular attachment flange capable of being attached on a fixed support, the attachment flange being axially maintained around the sleeve and capable of pivoting around the latter, and means for ensuring a seal between the maintaining collar and the support on which it is intended to be attached.

The maintaining collar according to the invention is notably remarkable in that the attachment flange may pivot around the sleeve so that the collar may be attached on a fixed support without having to exert torsional movements on the electric cables. The maintaining collar according to the invention is also remarkable in that it has means with which a seal may be ensured with the support on which it is attached. Thus, this collar is perfectly adapted to a sealed attachment on a separation partition between the hollow structure and the thrust reversion compartment of a turbine engine nacelle.

An annular seal gasket may be housed in a groove formed at the outer periphery of the sleeve in order to ensure a seal between the maintaining collar and the support on which it is intended to be attached.

The attachment flange may be axially maintained around the sleeve between a flank of the sleeve and an axial retaining ring housed in a groove of the sleeve. This attachment flange may be a metal plate provided with bores for letting through fixing screws, these bores being preferably regularly spaced apart on the whole circumference of the attachment flange.

The axial ends of the sleeve may each comprise means for maintaining the protective sheaths of the electric cables.

SHORT DESCRIPTION OF THE DRAWINGS

Other features and advantages of the present invention will become apparent from the description made below, with reference to the appended drawings which illustrate an exemplary embodiment thereof without any limiting features. In these figures.

DETAILED DESCRIPTION OF AN EMBODIMENT

Figure 1:
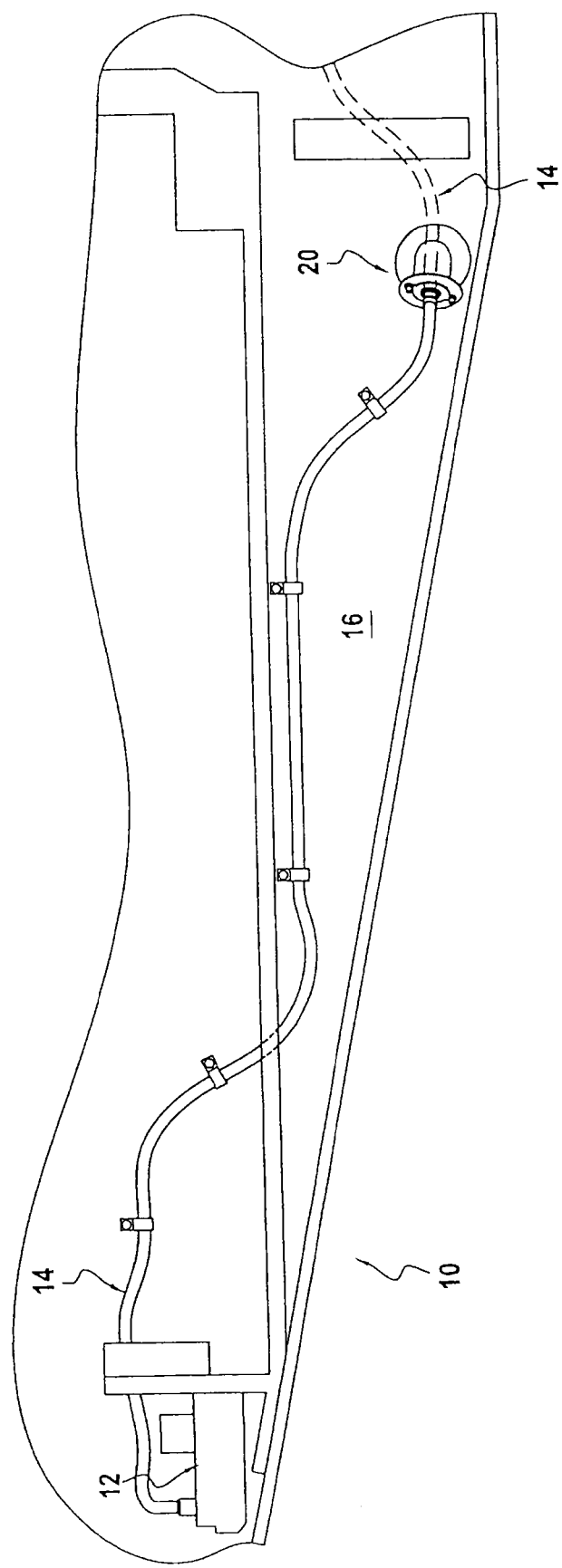
FIG. 1 is a schematic view of a maintaining collar according to the invention in its environment.

FIG. 1 schematically illustrates the lower portion of a cowl 10 of a turbine engine grid thrust reverser.

This semi-cylindrical cowl 10 partly illustrated in FIG. 1 notably comprises an electric lock 12 which is intended to ensure that the cowls of the thrust reverser are maintained in a closed position during the whole duration of the flight. When it is not powered, this lock 12 maintains the cowls in the closed position. When it is electrically powered, the lock 12 is unlocked thereby allowing deployment of the cowls of the thrust reverser.

Figure 2:
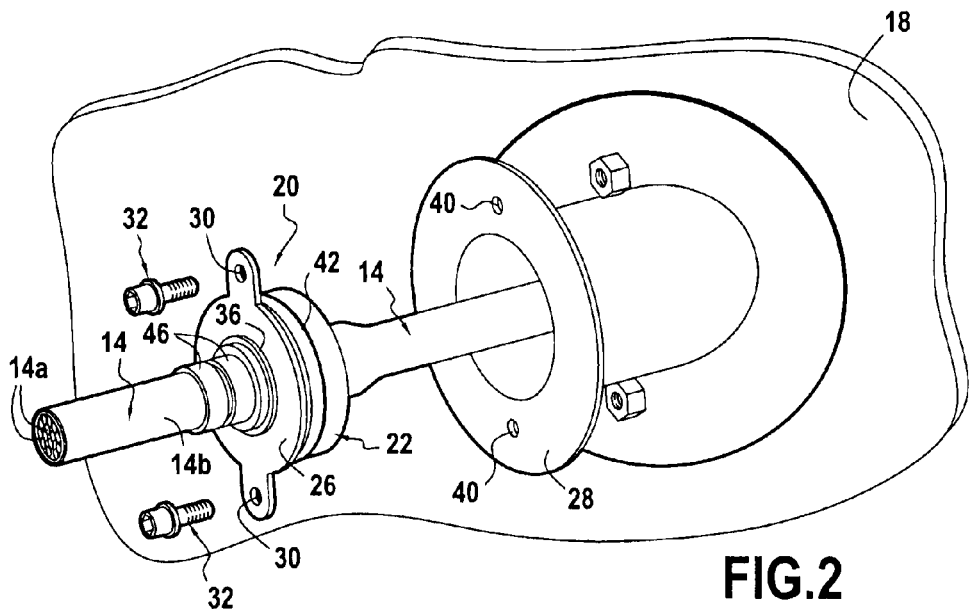
FIG. 2 is an enlarged and exploded view of the maintaining collar of FIG. 1.

The lock 12 is controlled by the system for controlling the thrust reverser (not shown in the figures) and electrically powered by the electric network of the aircraft (not shown). The electric cables 14a (FIG. 2) for controlling and electrically powering the lock 12 are grouped in an electric assembly 14 connected to the thrust reverser control system on the one hand and to the electric network of the aircraft on the other hand.

The electric assembly 14 therefore makes its way inside the lower portion of the cowl 10 in order to return in the high portion of this same cowl, to the area of the pylon of the aircraft where it may notably be connected to the electric network of the aircraft. On its path, the electric assembly 14 in particular passes through a hollow structure 16 of the cowl 10. This hollow structure 16 is floodable, i.e. it may be accidentally filled with engine fluids such as kerosene or oil. At this hollow structure 16, the electric assembly 14 has to pass through the partition 18 of this structure in order to open out on the other side into a neighboring compartment, a so-called thrust reversion compartment (not shown in the figures).

Unlike the hollow structure 16, the thrust reversion compartment should be perfectly fluid-proof. Also, it is important that the crossing of the partition 18 of the hollow structure 16 by the electric assembly 14 be fluid-proof.

For this purpose, according to the invention, a collar 20 is provided which allows the electric cables 14a of the assembly 14 to be sealably maintained on the partition 18 of the hollow structure.

Figure 3:
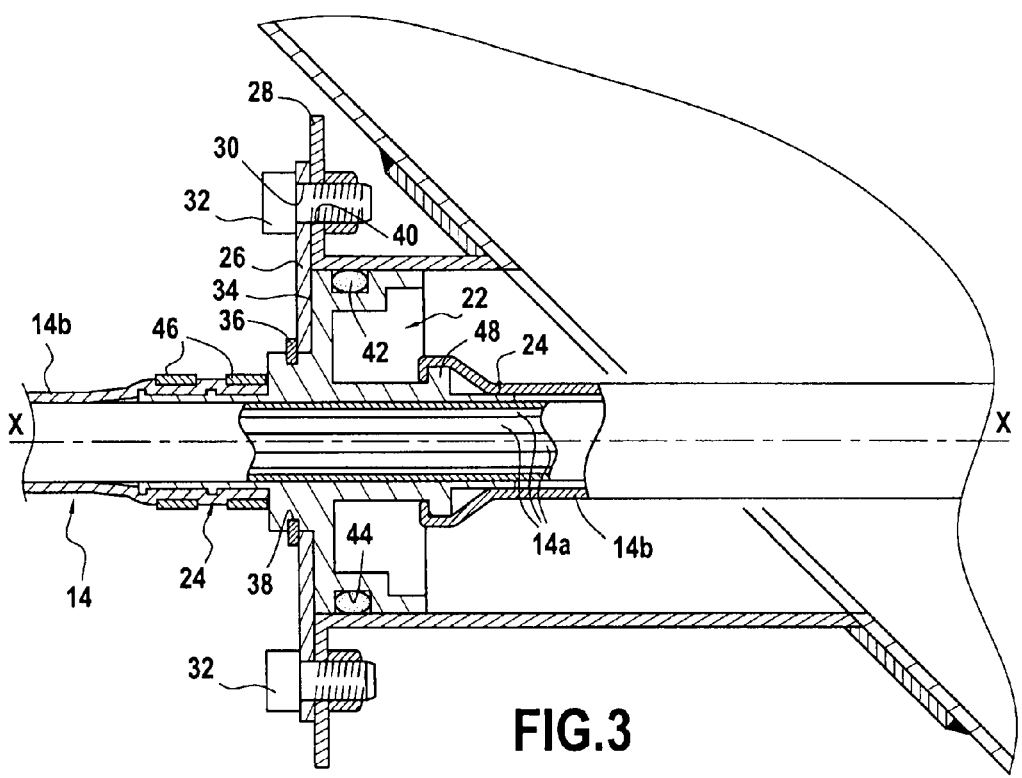
FIG. 3 is a longitudinal sectional view of the maintaining collar of FIGS. 1 and 2.

The maintaining collar 20 is axisymmetrical, i.e. it has symmetry relatively to its axis of revolution X-X. It notably comprises an annular sleeve 22 which is crossed by the electric cables 14a of the assembly 14. This sleeve has two axial ends 24 around which protective sheaths 14b of the electric cables 14a (FIG. 3) are mounted.

The maintaining collar 20 also comprises an annular attachment flange 26 which is attached on an annular support 28 firmly attached to the partition 18 of the hollow structure. More specifically, the attachment flange is a metal plate which is provided with bores 30 for letting through fixing screws 32 allowing the maintaining collar to be attached onto the support 28. These bores 30 are preferably regularly spaced apart on the whole circumference of the attachment flange (they are two in number in the exemplary embodiment of FIGS. 1-3).

Moreover, the attachment flange 26 is axially maintained around the sleeve 22 and is capable of pivoting around the latter. For this purpose, the attachment flange 26 is maintained axially between a flank 34 of the sleeve 22 and an axial retaining ring 36 which is housed in a groove 38 of the sleeve (see FIG. 3). In this way, the attachment flange is blocked axially but may pivot around the sleeve and its axis of revolution X-X.

As the attachment flange 26 is free to rotate around the sleeve 22 of the maintaining collar, it is possible to align the bores 30 of this flange with the corresponding bores 40 formed in the support 28 without having to exert torsional movements on the electric assembly 14. Thus, the attachment of the maintaining collar 20 onto the support of the partition 18 may be achieved without any risk of damaging the electric cables 14a.

The maintaining collar 20 according to the invention further comprises means for ensuring a seal with the support 28 of the partition 18 on which it is attached. For this purpose, the maintaining collar includes an annular seal gasket 42 which is housed in a groove 44 formed at the outer periphery of the sleeve 22. This seal gasket 42 will come into contact with a cylindrical wall of the support 28 so as to prevent any fluid from the hollow structure 16 from penetrating into the thrust reversion compartment.

According to an advantageous provision of the invention, the axial ends 24 of the sleeve 22 each comprise means for maintaining protective sheaths 14b of the electric cables 14a.

For example, the protective sheath 14b of the electric cable which is positioned on the side of the hollow structure may be maintained on the corresponding axial end 24 of the sleeve 22 by means of maintaining flanges 46. Also, the protective sheath 14b of the electric cables which is positioned on the side of the thrust reversion compartment may be maintained on the corresponding axial end 24 of the sleeve by means of an annular shoulder 48 protruding relatively to this end.

The invention claimed is:

1. A maintaining collar for maintaining electric cables, the collar comprising:
   an annular sleeve which may be crossed by electric cables and having two axial ends around which protective sheaths of the electric cables are intended to be mounted;
   an annular attachment flange capable of being attached onto a fixed support, the attachment flange being axially maintained around the sleeve and capable of pivoting around the sleeve; and
   a seal between the maintaining collar and the support on which the maintaining collar is intended to be attached,
   wherein the attachment flange includes a central opening, and the sleeve includes a first annular shoulder portion which passes through the central opening of the attachment flange such that the attachment flange is capable of pivoting around the sleeve,
   wherein the sleeve includes a second annular shoulder portion with an outer circumferential surface which abuts an inner circumferential surface of the support,
   wherein the seal is an annular seal gasket housed in a groove formed in the second shoulder portion of the sleeve, and
   wherein the attachment flange is maintained axially around the first shoulder portion of the sleeve between a flank of the sleeve and an axial retaining ring housed in a groove in the first shoulder portion of the sleeve, the flank of the sleeve extending radially and connecting the first shoulder portion of the sleeve and the second shoulder portion of the sleeve.

2. The maintaining collar according to claim 1, wherein the seal is an annular seal gasket housed in a groove formed at an outer periphery of the sleeve.

3. The maintaining collar according to claim 1, wherein the attachment flange is maintained axially around the sleeve between a flank of the sleeve and an axial retaining ring housed in a groove of the sleeve.

4. The maintaining collar according to claim 1, wherein the attachment flange is a metal plate provided with bores for letting through fixing screws.

5. The maintaining collar according to claim 4, wherein the bores are regularly spaced apart over a whole circumference of the attachment flange.

6. The maintaining collar according to claim 1, wherein each of the axial ends of the sleeve comprises means for maintaining protective sheaths of the electric cables.

7. The maintaining collar according to claim 1, wherein said collar is axisymmetrical.

* * * * *